(12) United States Patent
Kumar et al.

(10) Patent No.: US 10,733,480 B2
(45) Date of Patent: Aug. 4, 2020

(54) CUSTOM AUTO TAGGING OF MULTIPLE OBJECTS

(71) Applicant: Adobe Inc., San Jose, CA (US)

(72) Inventors: Jayant Kumar, San Jose, CA (US); Zhe Lin, Fremont, CA (US); Vipulkumar C. Dalal, Cupertino, CA (US)

(73) Assignee: Adobe Inc., San Jose, CA (US)

( * ) Notice: Subject to any disclaimer, the term of this patent is extended or adjusted under 35 U.S.C. 154(b) by 141 days.

(21) Appl. No.: 16/039,311

(22) Filed: Jul. 18, 2018

(65) Prior Publication Data

US 2020/0026956 A1    Jan. 23, 2020

(51) Int. Cl.
    *G06K 9/62*    (2006.01)
(52) U.S. Cl.
    CPC .......... *G06K 9/627* (2013.01); *G06K 9/628* (2013.01); *G06K 9/6228* (2013.01)
(58) Field of Classification Search
    CPC combination set(s) only.
    See application file for complete search history.

(56) References Cited

U.S. PATENT DOCUMENTS

| 10,223,611 B1* | 3/2019 | Price | G06K 9/6232 |
| 2005/0169529 A1* | 8/2005 | Owechko | G06K 9/469 382/190 |
| 2014/0201126 A1* | 7/2014 | Zadeh | A61B 5/4803 706/52 |
| 2016/0140424 A1* | 5/2016 | Wang | G06K 9/66 382/156 |
| 2017/0147905 A1* | 5/2017 | Huang | G06K 9/6232 |
| 2018/0204111 A1* | 7/2018 | Zadeh | G06N 3/0436 |
| 2018/0330198 A1* | 11/2018 | Harary | G06K 9/00691 |

OTHER PUBLICATIONS

Meng Wang,"Assistive Tagging: A Survey of Multimedia Tagging with Human-Computer Joint Exploration",pp. 4-15,ACM Computing Surveys, vol. 44, No. 4, Article 25, Publication date: Aug. 2012.*

Jia Deng,"Fine-Grained Crowdsourcing for Fine-Grained Recognition",2013 IEEE Conference on Computer Vision and Pattern Recognition, pp. 580-587,Jun. 23-28, 2013.*

(Continued)

*Primary Examiner* — Omar S Ismail
(74) *Attorney, Agent, or Firm* — SBMC

(57) ABSTRACT

There is described a computing device and method in a digital medium environment for custom auto tagging of multiple objects. The computing device includes an object detection network and multiple image classification networks. An image is received at the object detection network and includes multiple visual objects. First feature maps are applied to the image at the object detection network and generate object regions associated with the visual objects. The object regions are assigned to the multiple image classification networks, and each image classification network is assigned to a particular object region. The second feature maps are applied to each object region at each image classification network, and each image classification network outputs one or more classes associated with a visual object corresponding to each object region.

20 Claims, 13 Drawing Sheets

(56) References Cited

OTHER PUBLICATIONS

Tao Chen,"Object-Based Visual Sentiment Concept Analysis and Application",MM'14, Nov. 3-7, 2014,pp. 368-375.*
Hernisa Kacorri,"People with Visual Impairment Training Personal Object Recognizers: Feasibility and Challenges",CHI 2017, May 6-11, 2017, pp. 5839-5848.*
Mohammad Amin Sadeghi,"Recognition Using Visual Phrases",Computer Vision and Pattern Recognition (CVPR), Conference on Jun. 20-25, 2011,pp. 1745-1752.*
Grant Van Horn,"The i Naturalist Species Classification and Detection Dataset",The IEEE Conference on Computer Vision and Pattern Recognition (CVPR), Jun. 18-23, 2018, pp. 8769-8776.*
"GitHub—openimages/dataset: The Open Images dataset", Retrieved at: https://github.com/openimages/dataset—on Apr. 30, 2018, 1 pages.
Khosla,"Novel Dataset for Fine-Grained Image Categorization: Stanford Dogs", IEEE Conference on Computer Vision and Pattern Recognition (CVPR), 2011., Dec. 2011, 2 pages.
Krause,"3D Object Representations for Fine-Grained Categorization", 4th IEEE Workshop on 3D Representation and Recognition, at ICCV 2013 (3dRR-13), Dec. 8, 2013, 8 pages.
Lin,"Bilinear CNN Models for Fine-grained Visual Recognition", Proceedings of the IEEE International Conference on Computer Vision. 2015., Apr. 29, 2015, 9 pages.
Simon,"Generalized orderless pooling performs implicit salient matching", Jul. 20, 2017, 10 pages.
Welinder,"Caltech-UCSD Birds 200", California Institute of Technology. CNSTR-2010-001., Sep. 2010, 15 pages.

\* cited by examiner

CUSTOM AUTO TAGGING OF MULTIPLE OBJECTS

BACKGROUND

Image tagging is useful for organizing, managing, and searching images. Custom tagging is a specialized type of image tagging, in which images are tagged with custom classes determined by a user. Custom classes may be fine-grained classes of a general object category. For example, a user may define custom classes such as basket-ball shoes, gym shoes or football shoes for a general object category of shoes. Custom classes may also be customized for specific use cases, such as a business user who tags assets for day-to-day operations and management. For example, the business user may tag images for a general object category of automobiles with custom classes such as model numbers and various points of view, such as top-view, side-view, rear-view, interior, and exterior. Custom tagging may also improve stock or inventory search capabilities based on custom queries associated with custom classes.

Although images may be tagged manually by a person or a group of people, it is more convenient to utilize a device trained with machine learning to tag images automatically, particularly a large volume of images. A device trained with machine learning is useful so long as the device is able to perform this function accurately and within a reasonable time.

Even with automation, custom tagging is very challenging for fine-grained classification when the difference between objects is subtle, such as a minor cosmetic difference in appearance. For example, automobiles having the same make but different model numbers may have similar exterior appearances, thus making it difficult to distinguish custom classes of the different models. Another challenge for custom tagging is apparent when multiple objects are present within a single image. Conventional approaches for custom tagging are performed by focusing on images containing one type of object, such as cars, birds, or dogs. These conventional approaches for custom tagging fail to identify the correct classes when the models are applied to images containing different kinds of objects.

SUMMARY

Conventional approaches to fine-grained classification have achieved performance gains by utilizing deep learning. These conventional deep architectures and techniques are generally trained and evaluated based on images containing only one object type. These conventional approaches are not effective or efficient for managing fine-grained classification for multiple objects, particularly for custom automatic tagging, i.e., custom auto tagging.

To address this issue of custom auto tagging, object detection may be used to localize objects of interest so that, subsequently, fine-grained inference may be performed by focusing on the localized regions. In particular, an object detector may be used at the front end to detect variations in the fine-grained classes and scale efficiently to a large number of object categories. Fine-grained classification may then be applied for each detected object.

Conventional approaches also do not scale well for a large number of different objects in a single image because every object will require full model inference of the deep model. The architecture described herein scales well for any type of fine-grained classification, even classifications for large groups of objects. Specifically, the architecture allows for re-using feature maps developed during object detection to construct auxiliary features for fine-grained classification. The computational overhead for constructing these auxiliary features is minimal, and the auxiliary features provide a good baseline for multi-object fine-grained classification. As a result, additional gains in accuracy may be achieved by the architecture of the custom auto tagging technique.

One aspect is a method in a digital medium environment for custom auto tagging of multiple objects. The method is implemented by a computing device that includes an object detection network and multiple image classification networks. An image is received at the object detection network and includes multiple visual objects. Multiple first feature maps are applied to the image at the object detection network and generate multiple object regions associated with the multiple visual objects. The multiple object regions are assigned to the multiple image classification networks, and each image classification network is assigned to a particular object region. Multiple second feature maps are applied to each object region at each image classification network, and each image classification network outputs one or more classes associated with a visual object corresponding to each object region.

Another aspect is a computing device in a digital medium environment for custom auto tagging of multiple objects. The computing device comprises an object detection network and multiple image classification networks. The object detection network is configured to receive an image that includes multiple visual objects, to apply multiple first feature maps to the image, and to generate multiple object regions associated with multiple visual objects. The multiple image classification networks are configured to receive a particular object region at each image classification network, to apply multiple second feature maps to each object region, and to output one or more classes associated with a visual object corresponding to each object region.

Still another aspect is a method in a digital medium environment for custom auto tagging of multiple objects in which the networks may be custom trained by a user after receiving general training at development or production. The object detection network and the multiple image classification networks are trained to localize image features and classify the localized image features based on a multi-class dataset of images associated with multiple classes. Subsequent to this training based on the multi-class dataset of images, the object detection network and the multiple image classification networks are trained incrementally to localize image features and classify the localized image features based on a custom dataset of images associated with one or more custom classes. Thereafter, the object detection network receives an image that includes multiple visual objects. Multiple object regions associated with the multiple visual objects are identified at the object detection network which, as stated above, has been trained based on the multi-class dataset and the custom dataset. One or more visual objects are classified with the custom class or classes at the multiple image classification networks which, as stated above, have been trained based on the multi-class dataset and the custom dataset.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
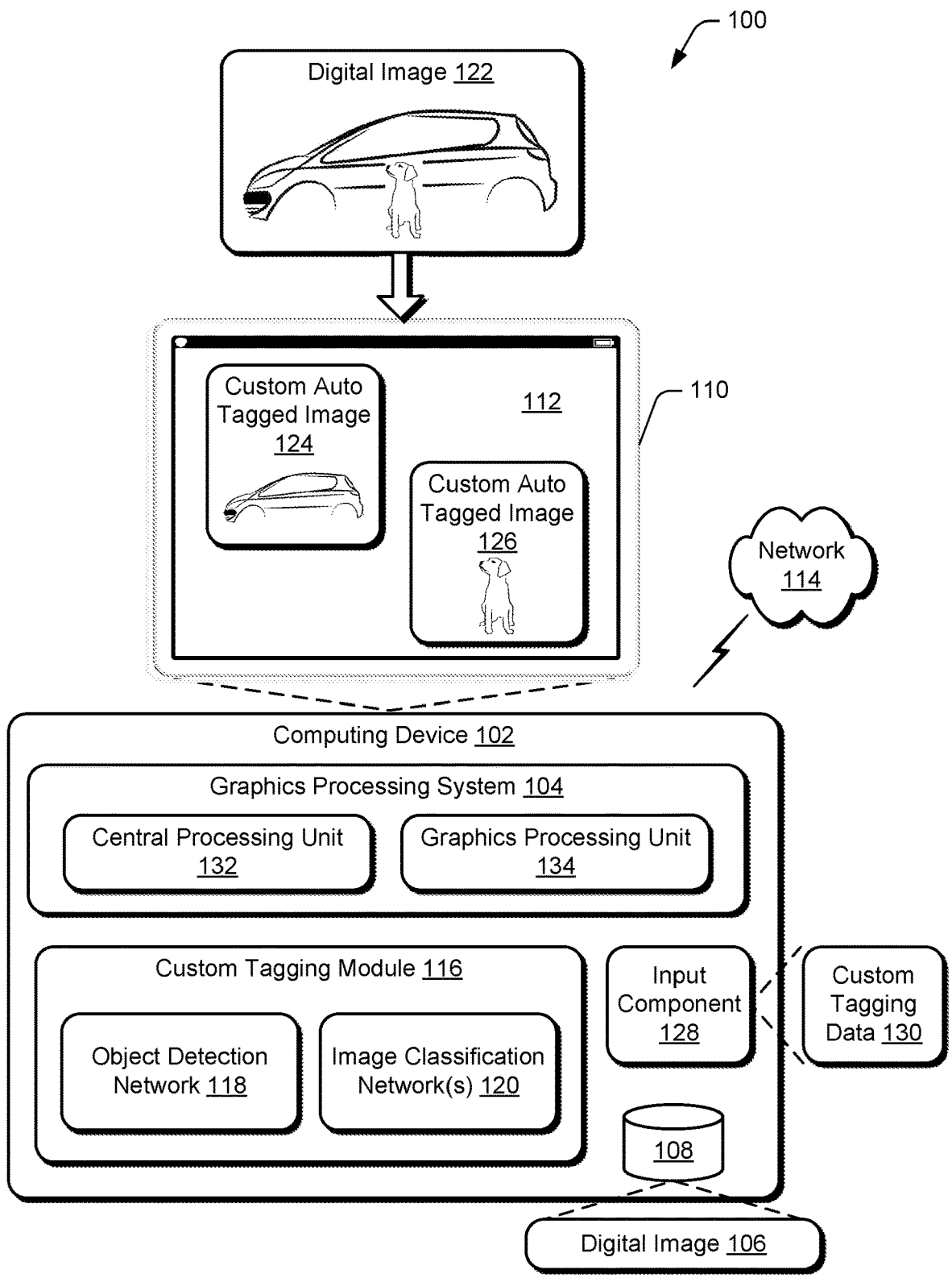
FIG. 1 is an illustration of an environment in an example implementation that is operable to employ digital image techniques described herein.

While the present invention is susceptible of embodiment in various forms, there is shown in the drawings and will hereinafter be described presently embodiments with the understanding that the present disclosure is to be considered an exemplification of the invention and is not intended to limit the invention to the specific embodiments illustrated. One skilled in the art will hopefully appreciate that elements in the figures are illustrated for simplicity and clarity and have not necessarily been drawn to scale. For example, the dimensions of some of the elements in the figures may be exaggerated relative to other elements with the intent to help improve understanding of the aspects of the embodiments being illustrated and described.

Systems trained with machine learning may effectively perform fine-grained classification accurately and within a reasonable time. In fact, conventional convolutional neural networks have achieved high accuracy in performing image classification for isolated objects of specific types, such as dogs, cars, and birds. Unfortunately, when these conventional models are applied to images which contain objects from other general categories, the accuracy and speed performance of these conventional models fall off significantly. In addition, these conventional models are not well suited for custom automatic tagging, i.e., custom auto tagging, due to their limited focus on specific object types.

The system and techniques described herein address the problems associated with multi-object fine-grained classification so that objects within an image or video are automatically associated with custom tags irrespective of the number of objects to be detected. Objects in images are localized to facilitate removal of background objects that interfere with fine-grained classification. After detection and localization of objects, custom classes are identified by focusing on regions and features of the image associated with the localized objects. Also, the custom tagging technique is scaled to many objects by utilizing feature maps already developed during localization of the objects. By utilizing the feature maps of the object detection process, the computation needed to obtain the maps is reduced substantially for all objects.

The system and method described herein for automatically tagging of images and videos allows for custom classes to be defined by a user. Custom classes may be fine-grained classes of a general object category or specific to a particular use-case. A user may train the custom auto tagging system and technique using a small set of data based on custom tags defined by the user. By training the system and technique with custom tags, users of the system and technique would benefit from more relevant search results and rankings generated from specific or fine-grained queries. Users would also have the ability to train the system and technique for custom tagging of multiple, different objects in a single image, video, or setting. Further, it should be noted that the custom auto tagging technique is applicable to video content as well as still images. Each frame or sampled frames from videos may be tagged, and a summary of the final tags may be generated using clustering.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ custom auto tagging techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 13.

The computing device 102 is illustrated as including a graphics processing system 104. The graphics processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in an output component 110 of a user interface, e.g., by a display device 112. Although illustrated as implemented locally at the computing device 102, functionality of the graphics processing system 104 may also be implemented as whole or part via functionality available via the network 114, such as part of a web service or "in the cloud."

An example of functionality incorporated by the graphics processing system 104 to process the image 106 is illustrated as a custom tagging module 116 that includes an object detection network 118 and multiple image classification networks 120. The custom tagging module 116 implements functionality to receive as an input a digital image 122 having multiple objects to be tagged. From this, the custom tagging module 116 receives the digital image 122 having multiple objects to be tagged and outputs multiple custom auto tagged images 124, 126 automatically and without user intervention.

The custom tagging module 116 performs the general functions of training and operating the custom auto tagging function of the computing device 102. The custom tagging module 116 receives one or more inputs from one or more sources, such as the storage 108, the network 114, or an input component 128 of the user interface. Examples of the input component 128 includes, but are not limited to, mechanical devices such keyboards and mice, audio devices such as microphones and sound recognition systems, electrical devices such as communication and transmission signals, and various types of sensors such as capacitive, resistive, motion, light, image, video, audio, temperatures, moisture, location and the like. In addition to the digital image or images, the custom tagging module 116 may also receive commands and/or data from the user via input component 128 to perform the custom auto tagging function based on a user input or user inputs received at an input component 124 of the user interface. Examples of the user input or inputs include a command to activate the custom auto tagging operation, a command to terminate the custom auto tagging operation, a command to indicate a type of custom class, and data to enhance the custom auto tagging operation. For training one or more networks of the custom tagging module 116, the custom tagging modules may receive custom tagging data 130 from the input component 128 that defines the custom tags to be learned. For example, the custom tagging data 130 may include a set of data based on at least one custom tag defined and provided by the user via the input component 128.

As stated above, the graphics processing system 104 is implemented at least partially in hardware of the computing device 102 to process and transform digital images, such as digital images 106 and 122. The computing device 102 is illustrated as including a central processing unit 132 and a graphics processing unit 134. The central processing unit 132 includes a few cores supported by cache memory to handle a limited number of threads for processing. The graphics processing unit 134 is a more specialized processor that includes hundreds of cores to handle thousands of threads simultaneously. The central processing unit 132 is capable of handling a variety of general tasks in a reasonable manner, whereas the graphics processing unit 134 is capable of handling certain specialized tasks more quickly and efficiently than the central processing unit. Since graphic processing requires a lot of repeated mathematical operations, the graphics processing unit 134 is well suited to handle image and video rendering and custom tagging. By allocating tasks appropriately between the central processing unit 132 and the graphics processing unit 134, the computing device 102 is capable of running efficiently to provide a desirable experience for a user. At least most of the system and method of custom auto tagging described herein would be better performed by the graphics processing unit 134. However, it is to be understood that the central processing unit 132 may perform at least some of the tasks for colorization, particularly for a more powerful central processing unit and/or a central processing unit that includes graphics processing capabilities.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2A:
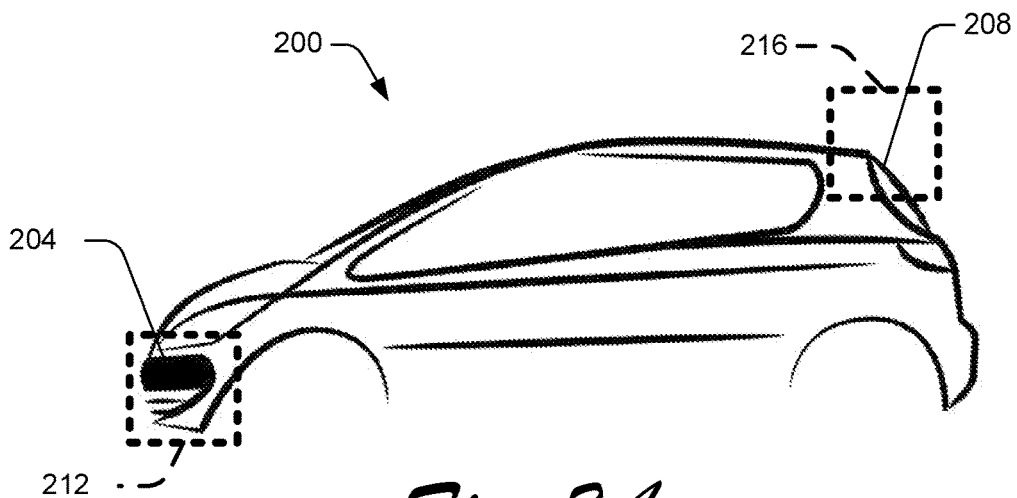
FIGS. 2A, 2B, and 2C depict examples of images with multiple objects to be classified.
Figure 2B:
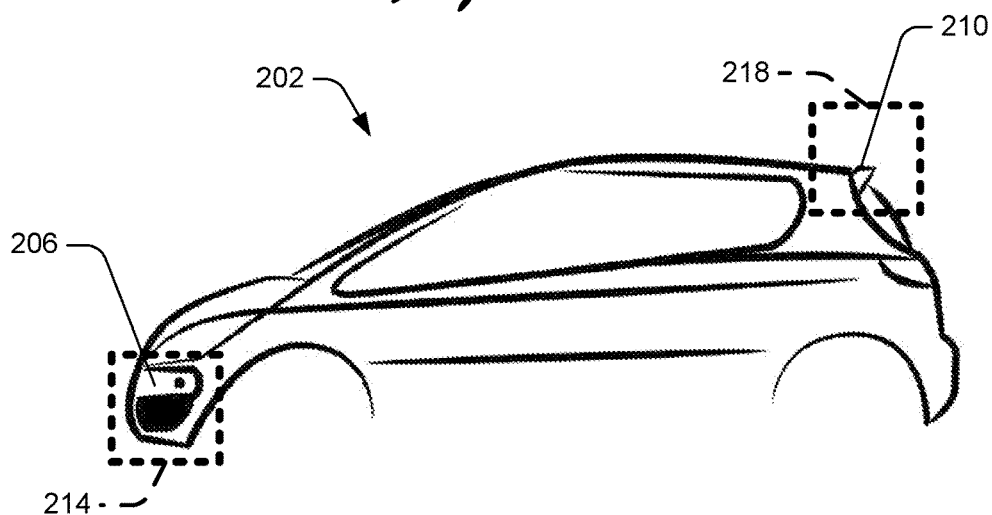

Referring to FIGS. 2A and 2B, custom auto tagging necessitates an approach capable of focusing on subtle differences in the appearance of parts or objects of an image or scene. For example, the exteriors of different vehicles may look very similar in overall shape and appearance, particularly different models having the same make. Minor details in the vehicle bodies may be the primary discriminatory factors to determine the correct classes of the vehicles. The vehicles 200, 202 of FIGS. 2A and 2B have the same general profile, but the front fender 204 of the first vehicle 200 in FIG. 2A is slightly different from the front fender 206 of the second vehicle 202 in FIG. 2B. Similarly, the back roofline 208 of the first vehicle 200 in FIG. 2A is slightly different from the back roofline 210 of the second vehicle 202 in FIG. 2B.

The custom auto tagging technique facilitates image classification of similar looking images by localizing objects within each image. For example, an object detection network may localize the front fender 204 of the first vehicle 200 by identifying a first bounding box 212 and localize the front fender 206 of the second vehicle 202 by a second bounding box 214 Similarly, the object detection network may localize the back roofline 208 of the first vehicle 200 by identifying a third bounding box 216 and localize the back roofline 210 of the second vehicle 202 by a second bounding box 218. These bounding boxes 212-218 allow the custom auto tagging technique to associate fine-grained classes to these subtle object features and facilitate a user's ability to develop custom classes for general object categories.

Figure 2C:
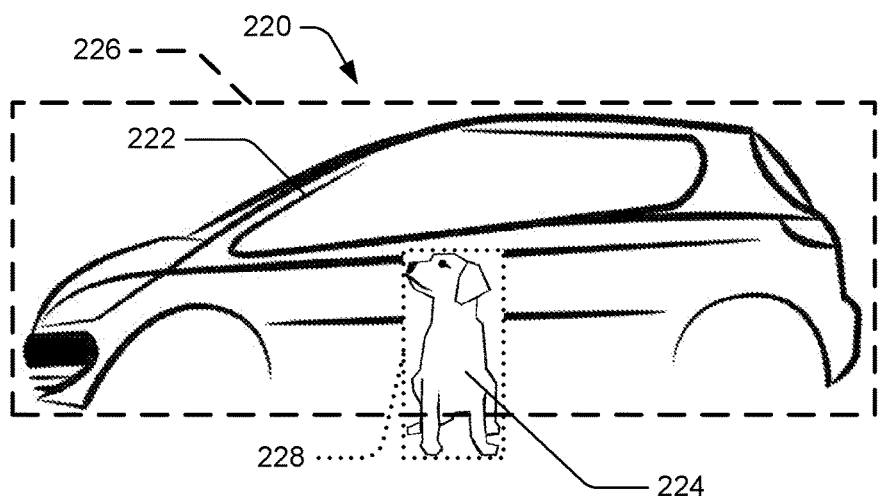

Referring to FIG. 2C, custom auto tagging also addresses the challenge of distinguishing multiple different objects present in the same image or scene, even if they overlap each other. For example, the image 220 of FIG. 2C includes a vehicle 222 and an animal 224. For this example, the animal 224 is positioned in front of the vehicle 222 such that the animal overlaps or hides a portion of the vehicle. Again, similar to FIGS. 2A and 2B, the custom auto tagging technique facilitates image classification of multiple objects in a single image by localizing the objects. For example, an object detection network may localize the vehicle 222 by identifying a fifth bounding box 226 and localize the animal 224 by a sixth bounding box 228. These bounding boxes 226, 228 allow the custom auto tagging technique to associate classes to different object features and facilitate a user's ability to develop custom classes for a new object category or a sub-category of an existing object category.

Custom Auto Tagging Architectures

Figure 3:
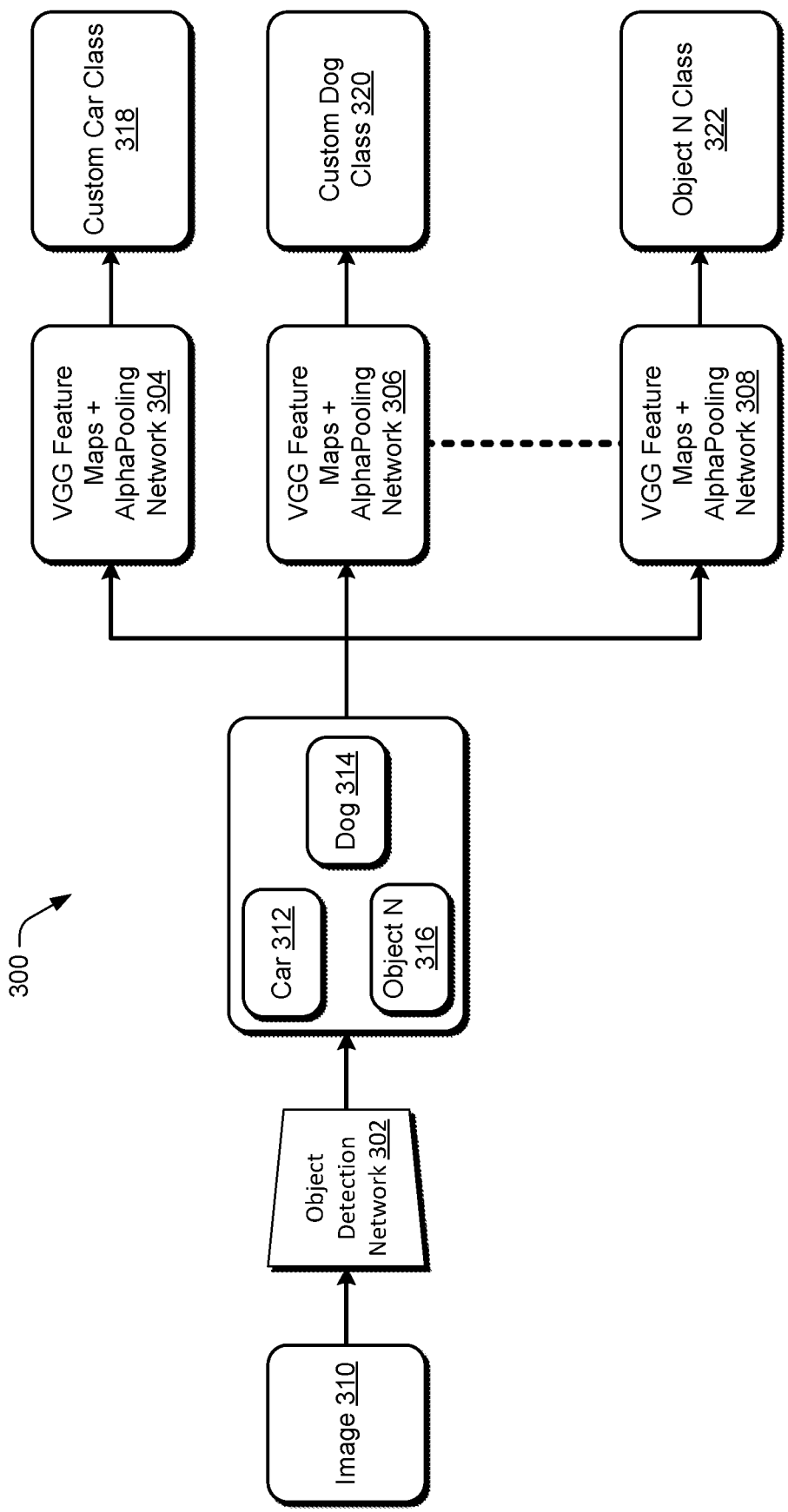
FIG. 3 depicts an example implementation of a custom auto tagging technique in which feature maps of the image classification network are utilized to classify the objects localized by the objection detection network.

FIG. 3 depicts an example implementation of a two-stage architecture 300 that may be applied to training, testing, and operation for custom auto tagging. The architecture 300 comprises a first network for the first stage and multiple second networks for the second stage. For this example implementation, the first network is represented by an object detection network 302 and second networks are represented by image classification networks 304-308. The framework of the first network, such as the object detection network 302, may be any type of machine learning network capable of localization of visual objects within an image or scene. Examples of the first network include, but are not limited to, region-based networks (convolutional neural networks), such as RCNN, Fast-RCNN, Faster-RCNN, Mask RCNN, and R-FCN; and unified real-time networks such as YOLO and SSD. The base model of the first network may be any type of network that is capable of supporting the framework, such as ResNet and Inception V3. Each of the second networks, such as image classification networks 304-308, may be any type of machine learning network capable of classification of visual objects within an image or scene, particularly fine-grained classification. Examples of the second networks include, but are not limited to, VGG, ResNet, and Inception V3.

A shown in FIG. 3, a computing device may perform custom auto tagging of multiple objects in a digital medium environment. The computing device includes an object detection network 302 and multiple image classification networks 304-308. The object detection network 302 is configured to receive an image 310 that includes multiple visual objects. The object detection network 302 identifies multiple tags in which each tag is associated with a particular visual object of the image 310. In order to classify each visual object with a particular class, the object detection network 302 applies multiple first feature maps to the image and generates object regions 312-316, for each visual object. The object detection network 302 communicates the object regions 312-316 to the image classification networks 304-308. Each of the image classification networks 304-308 is configured to receive the object region 312-316 assigned to the image classification network and apply multiple second feature maps and pooling layers to the object region. The second feature maps may be generated by a pre-trained network, such as the image classification networks 304-308 being previously trained using a large dataset of sample images. Thus, each image classification network 304-308 outputs one or more classes or sub-classes 318-322 associated with the visual object corresponding to the assigned object region 312-316.

Figure 4:
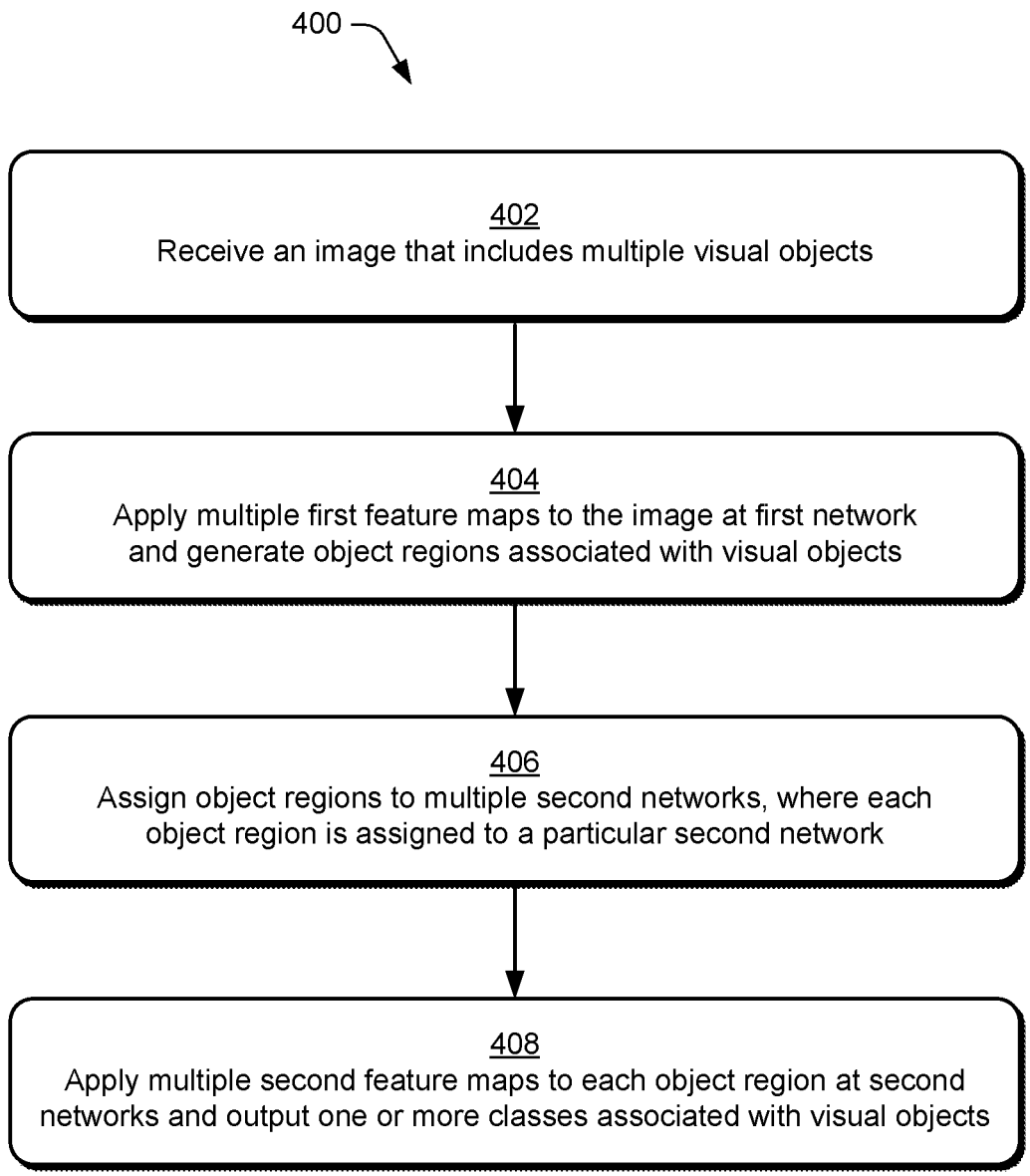
FIG. 4 is a flow diagram depicting a procedure in an example implementation of the custom auto tagging technique of FIG. 3.

FIG. 4 is a flow diagram depicting a procedure 400 in an example implementation of the custom auto tagging technique. In particular, a method performs custom auto tagging of multiple objects in a digital medium environment, as implemented by a computing device that includes an object detection network and multiple image classification networks. The object detection network 302 receives an image 310 that includes multiple visual objects at step 402. The image may be a still image, a video image, or a multimedia image. For video or some types of multimedia, each frame or sampled frames from videos may be tagged, and a summary of the final tags may be generated using clustering. Next, the object detection network 302 applies multiple first feature maps to the image 310 and generates multiple object regions 312-316 associated with the visual objects at step 404. The first feature maps are specific to the base model or network of the first network, such as the object detection network 302. The computing device then assigns the object regions 312-316 to multiple image classification networks 304-308 at step 406. Each object region 312-316 is assigned to a particular image classification network 304-308. Thereafter, each image classification network 304-308 applies multiple second feature maps to each object region 312-316 and outputs one or more classes associated with a visual object corresponding to each object region at step 408. The second feature maps are specific to the base model or network of the second network, such as image classification networks 304-308, and may or may not be similar to the first feature maps.

Figure 5:
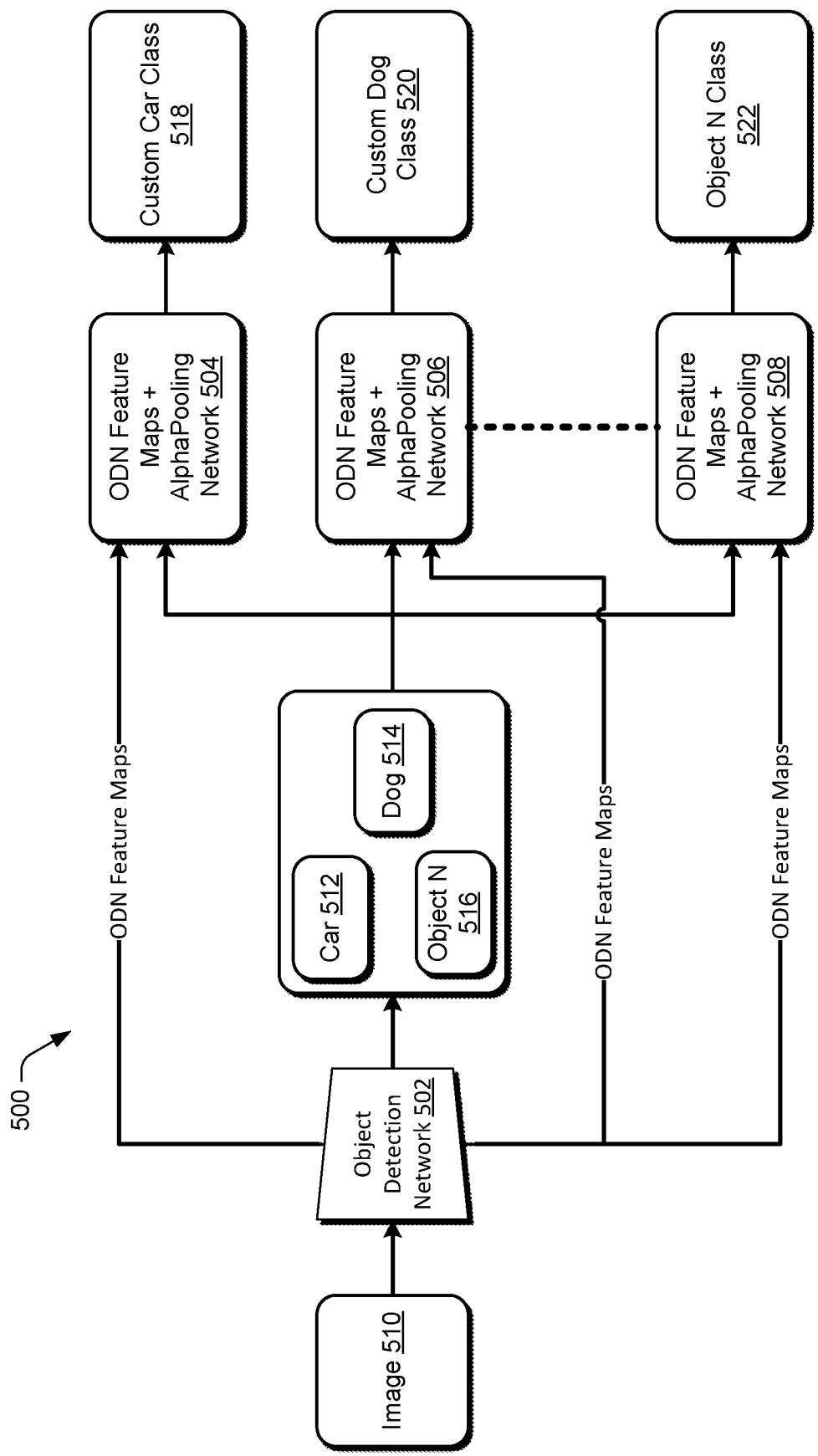
FIG. 5 depicts another example implementation of a custom auto tagging technique in which feature maps of the object detection network are utilized to classify the localized objects.

FIG. 5 depicts another example implementation of a two-stage architecture 500 that may be applied to training, testing, and operation for custom auto tagging. The architecture 500 comprises a first network for the first stage and multiple second networks for the second stage. For this example implementation, the first network is represented by an object detection network 502 and second networks are represented by image classification networks 504-508. The framework and base model of the first network in FIG. 5, such as the object detection network 502, are similar to the framework and base model of the first network represented in FIG. 3, such as the object detection network 302. Likewise, each network of the second networks of FIG. 5, such as image classification networks 504-508, is similar to each network of the second networks of FIG. 3, such as image classification networks 304-308. The primary difference between these architectures 300, 500 is that the first network of the architecture 500 of FIG. 5 provides additional information to the second network, relative to the architecture 300 of FIG. 3, as explained below.

For the architecture 500 shown in FIG. 5, the feature maps of the object detection network 502 are applied by the image classification networks 504-508 to obtain final classes. Relative to the architecture 300 of FIG. 3, this architecture 500 requires less computational effort and scales well as the quantity of visual objects increases. Computation to obtain object level feature maps adds minimal overhead, since the ROI pooled feature maps from the object detection network 502 is reused by the image classification networks 504-508. This approach scales well because substantial computation has been performed during object detection.

A shown in FIG. 5, a computing device may perform custom auto tagging of multiple objects in a digital medium environment. The computing device includes an object detection network 502 and multiple image classification networks 504-508. The object detection network 502 is configured to receive an image 510 that includes multiple visual objects. The object detection network 502 identifies multiple tags in which each tag is associated with a particular visual object of the image 510. In order to classify each visual object with a particular class, the object detection network 502 applies multiple feature maps to the image and generates object regions 512-516, for each visual object. The object detection network 502 communicates the object regions 512-516 to the image classification networks 504-508. Each image classification networks 504-508 is configured to receive the object region 512-516 assigned to the image classification network and apply the feature maps of the object detection network 502 and pooling layers to the object region. Thus, each image classification network 504-508 outputs one or more classes or sub-classes 518-522 associated with the visual object corresponding to the assigned object region 512-516.

Figure 6:
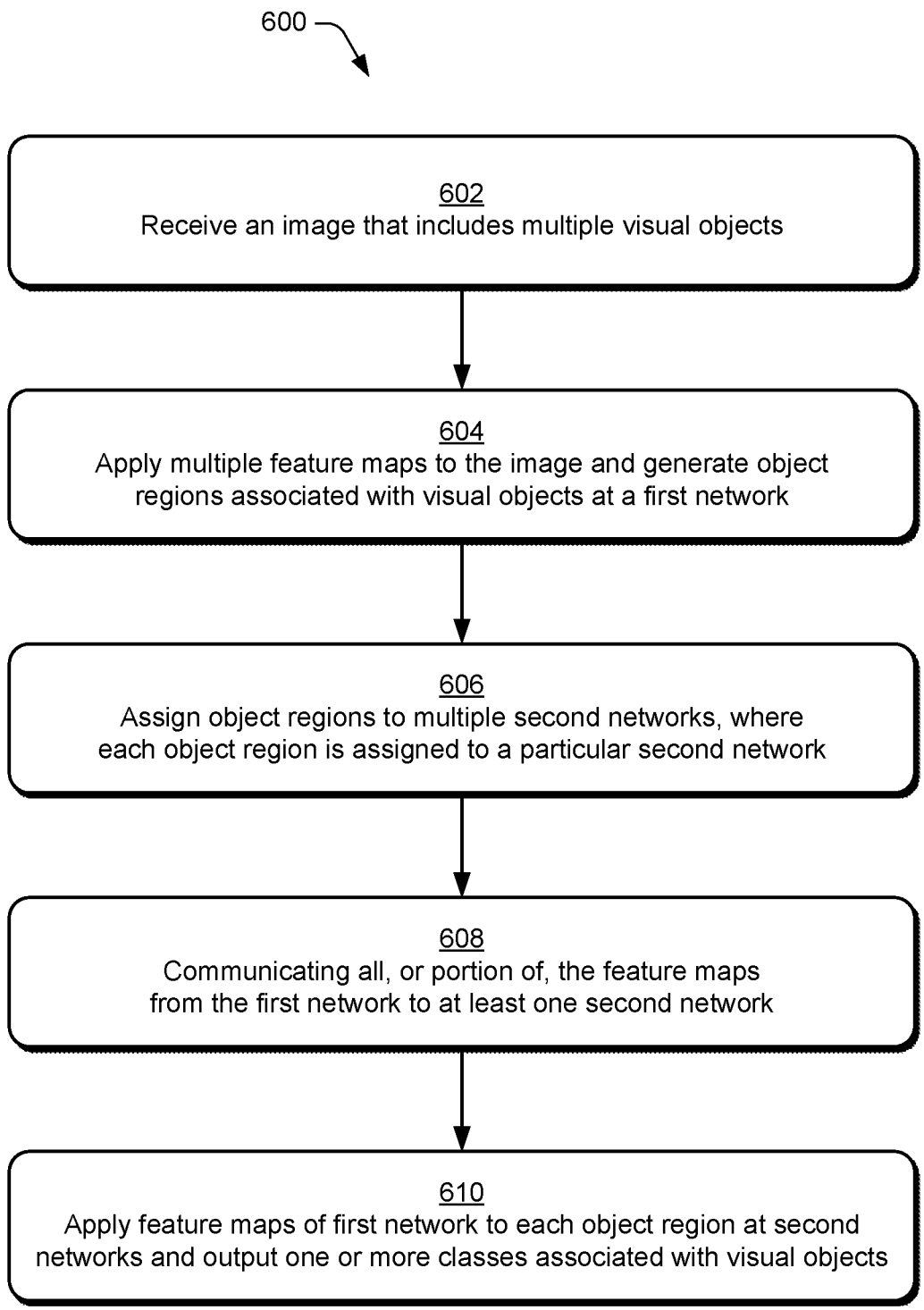
FIG. 6 is a flow diagram depicting a procedure in an example implementation of the custom auto tagging technique of FIG. 5.

FIG. 6 is a flow diagram depicting another procedure 600 in an example implementation of the custom auto tagging technique. In particular, a method performs custom auto tagging of multiple objects in a digital medium environment, as implemented by a computing device that includes an object detection network and multiple image classification networks. The object detection network 502 receives an image 510 that includes multiple visual objects at step 602. The image may be a still image, a video image, or a multimedia image. For video or some types of multimedia, each frame or sampled frames from videos may be tagged, and a summary of the final tags may be generated using clustering. Next, the object detection network 502 applies multiple feature maps to the image 510 and generates multiple object regions 512-516 associated with the visual objects at step 604. The feature maps are specific to the base model or network of the first network, such as the object detection network 502. The computing device then assigns the object regions 512-516 to multiple image classification networks 304-308 at step 606. Each object region 512-516 is assigned to a particular image classification network 504-508. In addition, the computing device, such as the object detection device 502 or another component, may communicate at least a portion of the feature maps from the object detection network to one or more image classification networks 504-508 at step 608. Thereafter, each image classification network 504-508 applies the feature maps of the object detection network 502 to each object region 512-516 and outputs one or more classes associated with a visual object corresponding to each object region at step 610.

It should be noted that the feature maps (i.e., second feature maps) applied at the image classification networks 504-508 are the same or similar to the feature maps (i.e., first feature maps) applied at the object detection network 502. In order to scale the approach to many classes, the feature maps from the object detection network 502 are reused for custom classification. This approach is quite efficient since most, if not all, of the computations for the feature maps occur at a single network, namely the object detection network 502.

Figure 7:
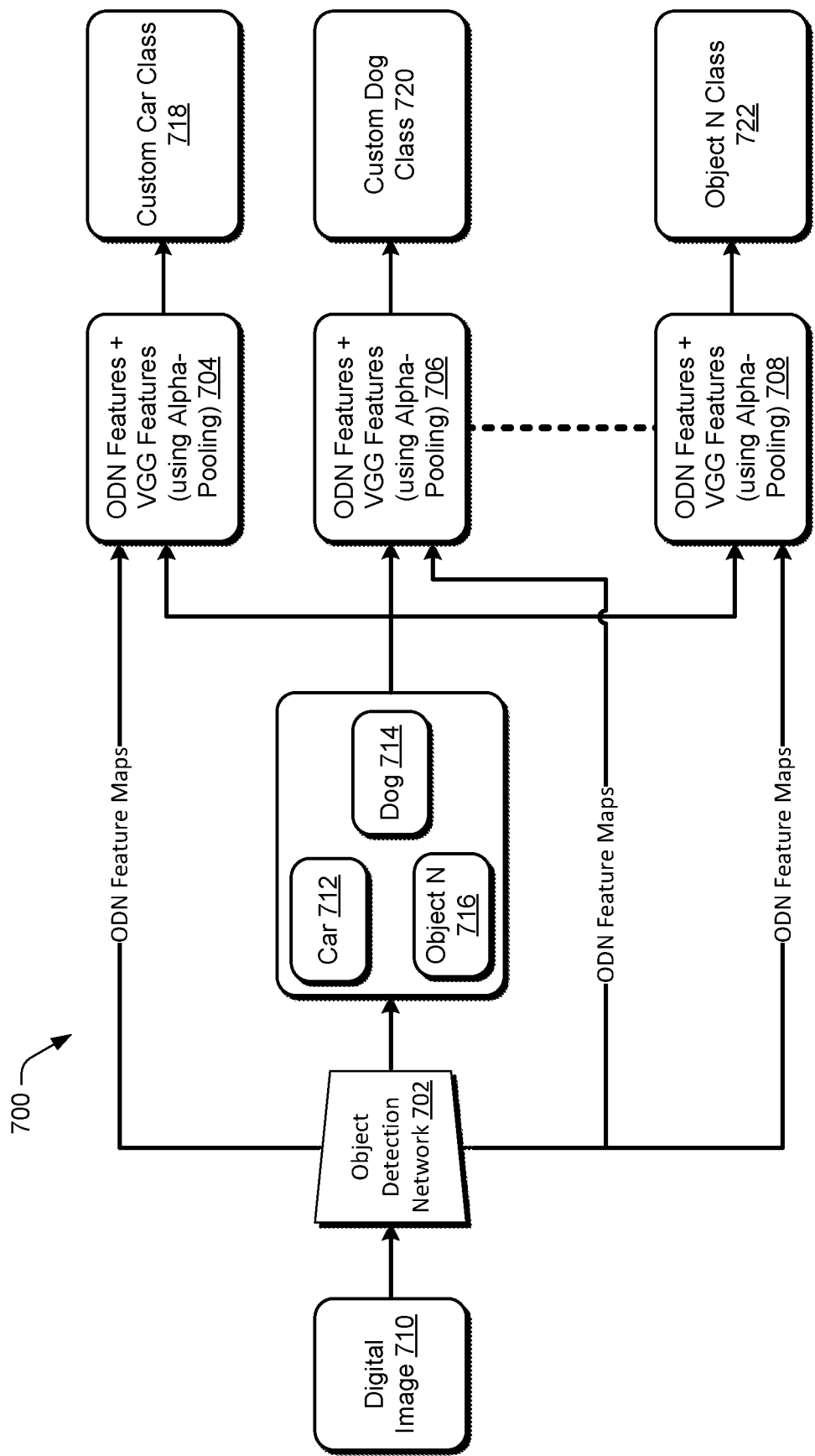
FIG. 7 depicts yet another example implementation of a custom auto tagging technique in which feature maps of the object detection network and the image classification networks are utilized to classify the localized objects.

FIG. 7 depicts yet another example implementation of a two-stage architecture 700 that may be applied to training, testing, and operation for custom auto tagging. The architecture 700 comprises a first network for the first stage and multiple second networks for the second stage. For this example implementation, the first network is represented by an object detection network 702 and second networks are represented by image classification networks 704-708. The framework and base model of the first network in FIG. 7, such as the object detection network 702, are similar to the framework and base model of the first network represented in FIGS. 3 and 5, such as the object detection networks 302, 502. Likewise, each network of the second networks of FIG. 7, such as image classification networks 704-708, is similar to each network of the second networks of FIGS. 3 and 5, such as image classification networks 304-308, 504-508. The primary difference among these architectures 300, 700, 500 is that the architecture 700 shown in FIG. 7 combines the features of the other architectures 300, 500 of FIGS. 3 and 5, as explained below.

For the architecture 700 shown in FIG. 7, the feature maps of the object detection network 702 are applied by the image classification networks 704-708 to obtain final classes. In addition, the image classification networks 704-708 apply their own feature maps to obtain the same final classes. The feature maps from the object detection network 702 and the image classification networks 704-708 are complimentary since both networks are optimized for different tasks. The final layer learns the combinations of the feature maps to classify each object.

A shown in FIG. 7, a computing device may perform custom auto tagging of multiple objects in a digital medium environment. The computing device includes an object detection network 702 and multiple image classification networks 704-708. The object detection network 702 is configured to receive an image 710 that includes multiple visual objects. The object detection network 702 identifies multiple tags in which each tag is associated with a particular visual object of the image 710. In order to classify each visual object with a particular class, the object detection network 702 applies multiple first feature maps to the image and generates object regions 712-716, for each visual object. The object detection network 702 communicates the object regions 712-716 to the image classification networks 704-708. Each image classification networks 704-708 is configured to receive the object region 712-716 assigned to the image classification network. Each image classification network 704-708 also applies the first feature maps of the object detection network 702 and second feature maps of the image classification networks, as well as the pooling layers, to the assigned object region. The second feature maps may be generated by a pre-trained network, such as the image classification networks 704-708 being previously trained using a large dataset of sample images. Thus, each image classification network 704-708 outputs one or more classes or sub-classes 718-722 associated with the visual object corresponding to the assigned object region 712, 714, 716.

Figure 8:
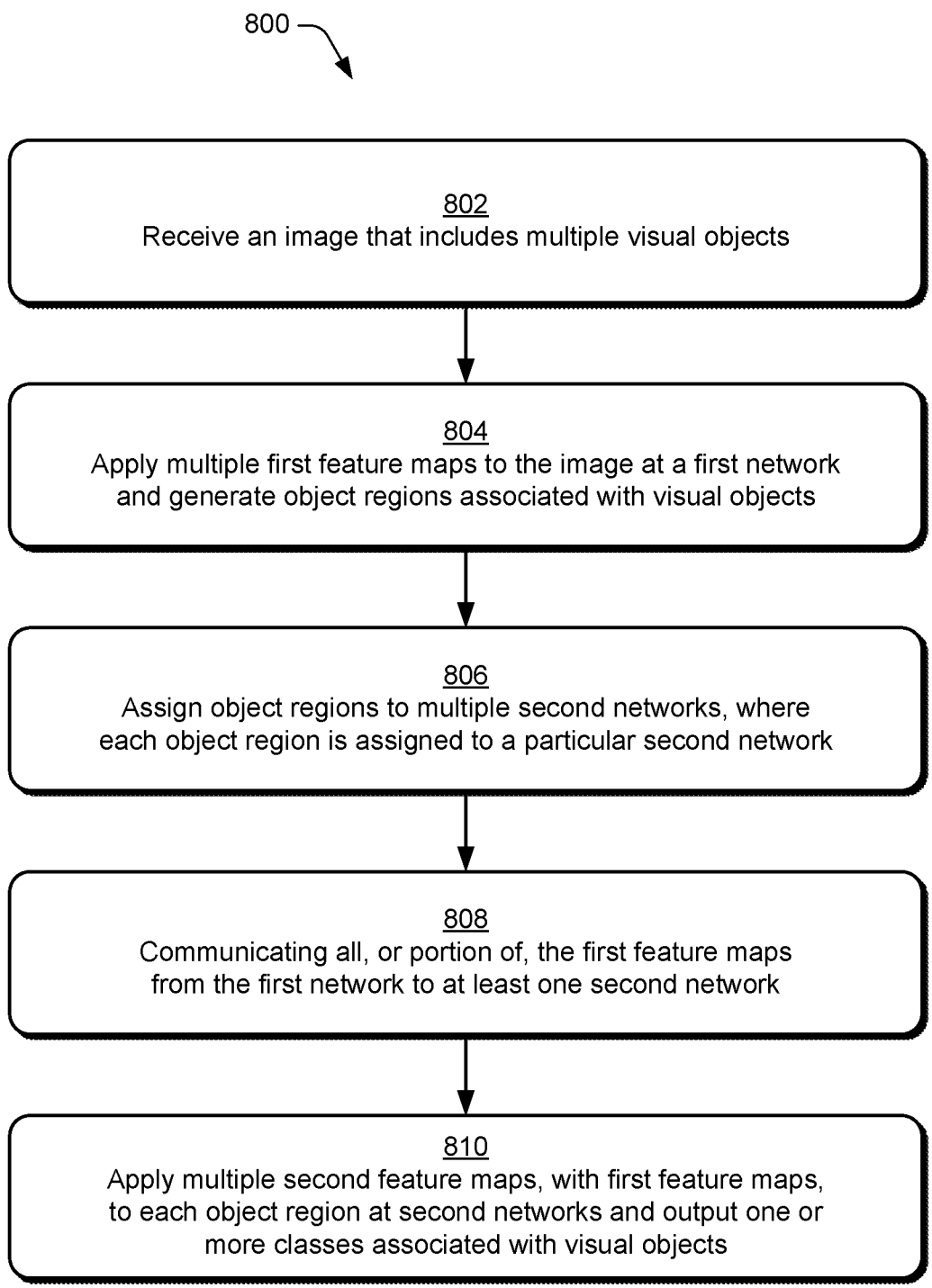
FIG. 8 is a flow diagram depicting a procedure in an example implementation of the custom auto tagging technique of FIG. 7.

FIG. 8 is a flow diagram depicting yet another procedure 800 in an example implementation of the custom auto tagging technique. In particular, a method performs custom auto tagging of multiple objects in a digital medium environment, as implemented by a computing device that includes an object detection network and multiple image classification networks. The object detection network 702 receives an image 710 that includes multiple visual objects at step 802. The image may be a still image, a video image, or a multimedia image. For video or some types of multimedia, each frame or sampled frames from videos may be tagged, and a summary of the final tags may be generated using clustering. Next, the object detection network 702 applies multiple first feature maps to the image 710 and generates multiple object regions 712, 714, 716 associated with the visual objects at step 804. The first feature maps are specific to the base model or network of the first network, such as the object detection network 702. The computing device then assigns the object regions 712, 714, 716 to multiple image classification networks 304-308 at step 806. Each object region 712, 714, 716 is assigned to a particular image classification network 704-708. In addition, the computing device, such as the object detection device 702 or another component, may communicate at least a portion of the first feature maps from the object detection network to one or more image classification networks 704-708 at step 808. Thereafter, each image classification network 704-708 applies the first feature maps of the object detection network 702 and second feature maps of the image classification network to each object region 712, 714, 716. Each image classification network 704-708 also outputs one or more classes associated with a visual object corresponding to each object region at step 810.

It should be noted that the first feature maps of the object detection network 702 are different from the second feature maps of the image classification networks 704-708. The architecture 700 of FIG. 7, and represented by the procedure 800 of FIG. 8, benefits from the application of two different feature maps, i.e., the first and second feature maps in conjunction with each other, to each object region 712, 714, 716.

Object Detection Network

Figure 9:
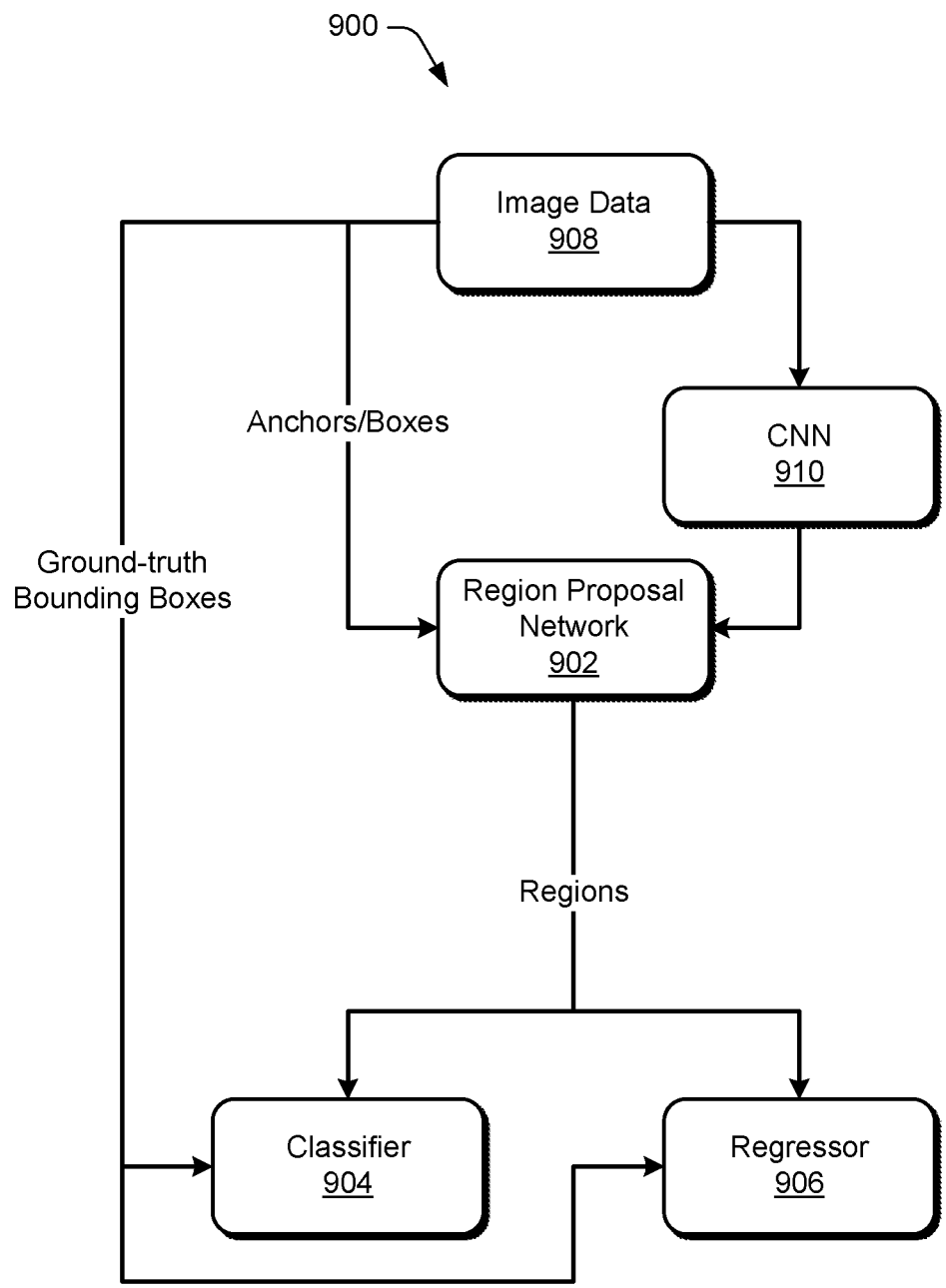
FIG. 9 depicts an example implementation of an object detection network for the custom auto tagging technique configured for training.

FIG. 9 depicts an example implementation of a first network, such as an object detection network 900, for the custom auto tagging technique configured for training. Other forms of object detection networks may be utilized for the custom auto tagging technique, and the object detection network 900 shown in FIG. 9 is one example. As stated above, the framework of the first network may be any type of machine learning network capable of localization of visual objects within an image or scene. Examples of the first network include, but not limited to, region-based networks such as RCNN, Fast-RCNN, Faster-RCNN, Mask RCNN, and R-FCN; and unified real-time networks such as YOLO and SSD. Also, the base model of the first network may be any type of network that is capable of supporting the framework, such as ResNet and Inception V3.

The object detection network 900 of the custom auto tagging technique may benefit from training by a large dataset so that the object detection network is capable of tagging many general objects. Thus, the object detection network 900 may be trained based on a multi-class dataset of images associated with multiple classes.

As shown in FIG. 9, the object detection network 900 may include a regional proposal network (RPN) 902 for generating region proposals as well as object detection components 904, 906 to detect objects using these proposals. The object detection components may include a classifier 904 and a regressor 906. The RPN 902 receives image data 908 as well as a processed version of the image data from a convolutional neural network (CNN) 910. Based on the image data and information from the CNN, the RPN 902 identifies the regions, in the form of bounding boxes, having the highest likelihood of including an object. The RPN 902 provides region proposals to the classifier 904 and the regressor 906. The classifier 904 and the regressor 906 examine the region proposals, in conjunction with ground-truth bounding boxes received from the image data 908 to check the occurrence of objects for the purpose of training the object detection network 900.

Figure 10:
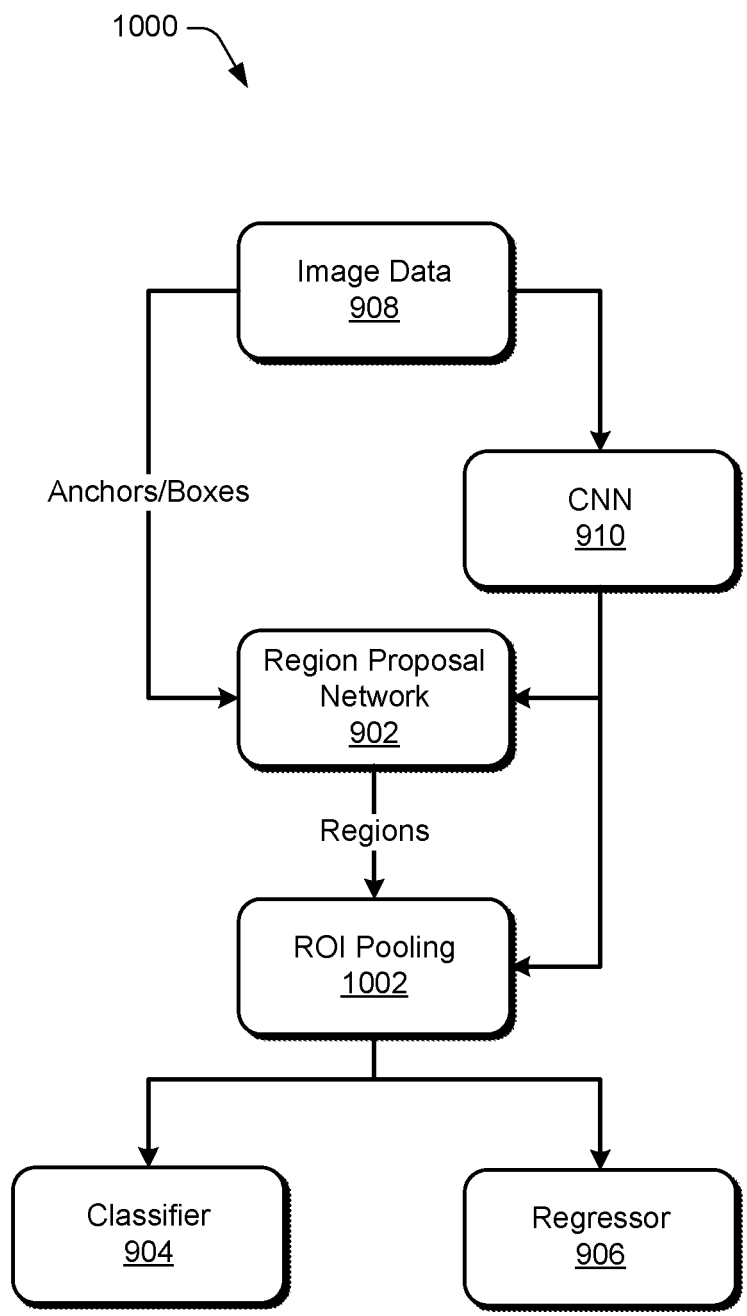
FIG. 10 depicts an example implementation of an object detection network for the custom auto tagging technique configured for testing and operation.

FIG. 10 depicts an example implementation of an object detection network 1000 for the custom auto tagging technique configured for testing and operation. The object detection network 1000 has a configuration for testing and operation, shown in FIG. 10, that is similar to the configuration for training, shown in FIG. 9. The configuration for testing and operation does not include links from the image data 908 to the classifier 904 and the regressor 906 in order to provide ground-truth information. Also, the region proposals generated by the region proposal network 902 are provided to an ROI Pooling 1002. The ROI Pooling 1002 also receives the processed version of the image data from the CNN 910. The ROI pooling 1002 provides classification information, based on the information received from the region proposal network 902 and the CNN 910, to the classifier 904 and the regressor 906. As a result of receiving the classification information, the classifier 904 outputs predictions of foreground objects or background non-objects, and the regressor 906 outputs recommendations for refining the bounding boxes for the purpose of testing and/or operating the object detection network 1000.

Image Classification Network

Figure 11:
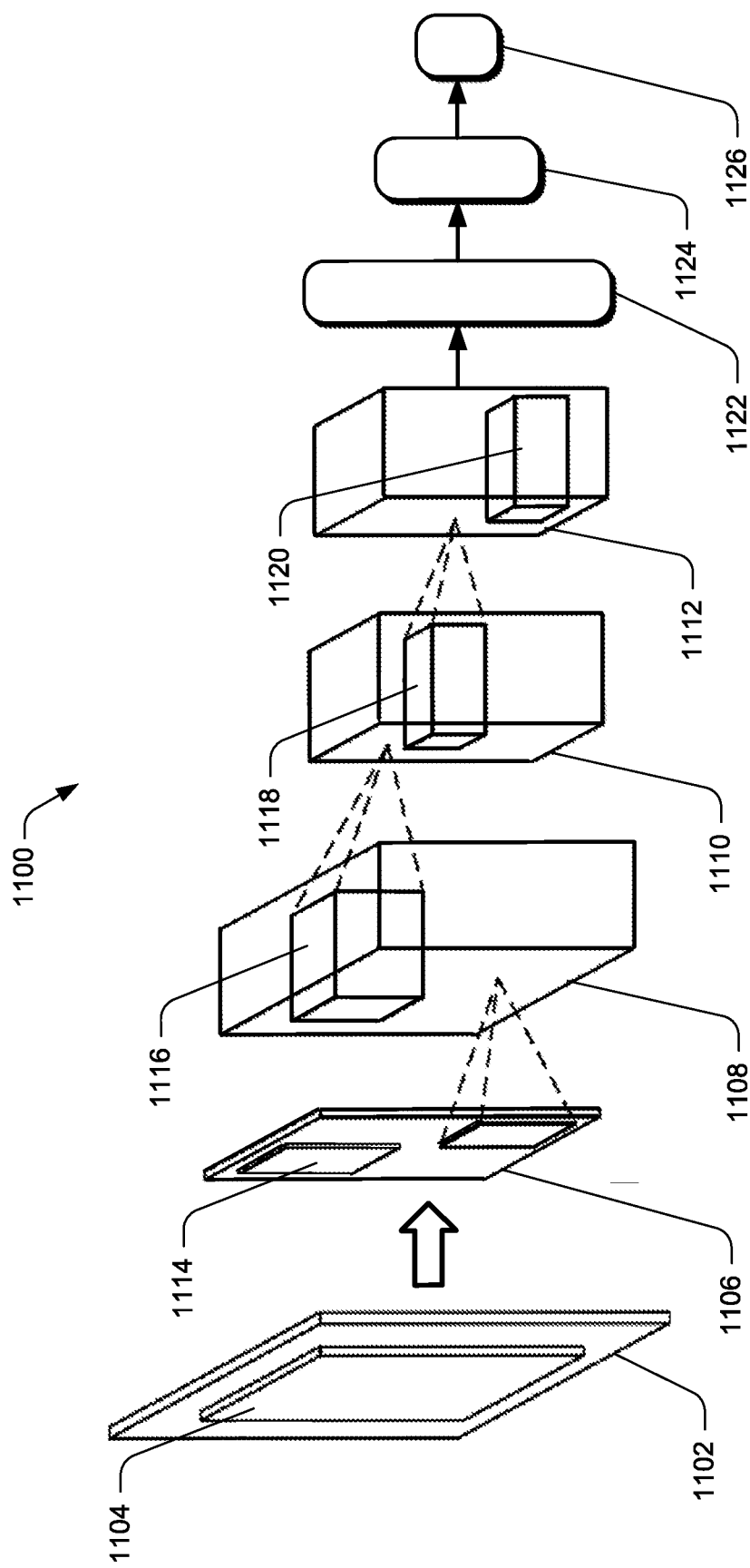
FIG. 11 depicts an example implementation of an image classification network for the custom auto tagging technique.

FIG. 11 depicts an example implementation of a second network, such as an image classification network 1100, with a sample input for the custom auto tagging technique. The image classification network 1100 may be applied to training, testing, and operation for custom auto tagging. As shown in FIG. 11, the image classification network 1100 is initiated by an input 1102 which includes an image 1104. The input 1102 is processed through multiple convolutional neural network layers and pooling layers 1106-1112. The layers 1106-1112 shown in FIG. 11 are merely representations, and the actual quantity of layers may be much greater due to the computational requirements of the classification process. The convolutional neural network layers and pooling layers 1106-1112 are shown in FIG. 11 to operate in series, so each layer processes the output 1104, 1114-1118 of a previous layer. It is to be understood that the image classification network 1100 shown in FIG. 11 is merely an example, and other features commonly used for convolution neural networks may be applied to this network. For example, the convolutional neural network layers and pooling layers 1106-1112 may also include residual connections that may utilize skip layers. The image classification network 1100 may also include fully connected layers 1122, 1124 to maintain full connections to all activations in previous layers as well as a final layer 1126 to provide one or more custom auto tag classes.

Custom Auto Training and Tagging

Figure 12:
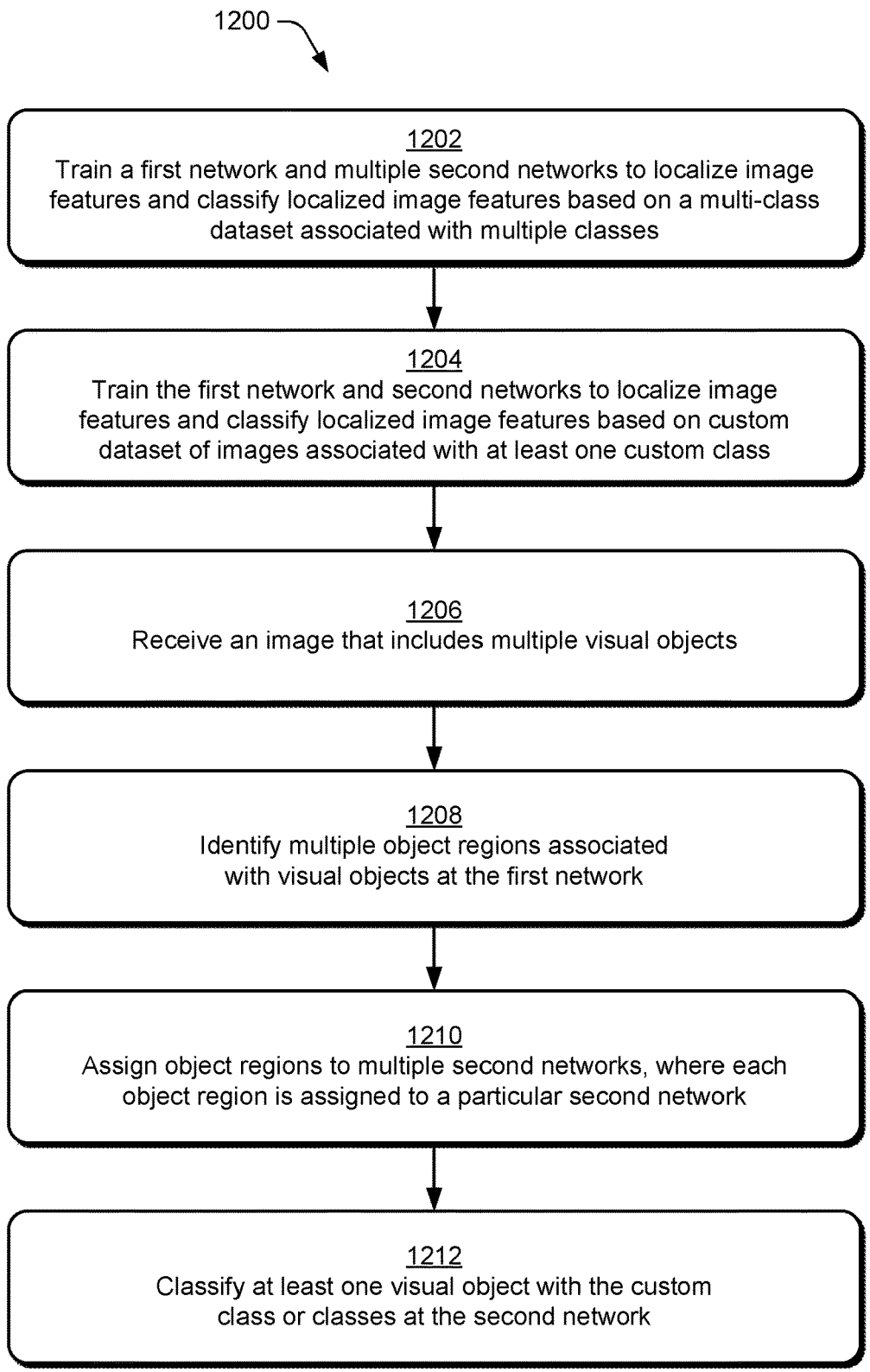
FIG. 12 is a flow diagram depicting a procedure in an example implementation showing custom training for the custom auto tagging technique.

FIG. 12 is a flow diagram depicting a procedure 1200 in an example implementation showing custom training for the custom auto tagging technique. In particular, a method performs custom auto tagging of multiple objects in a digital medium environment, as implemented by a computing device that includes an object detection network and multiple image classification networks. The computing device may train the first network to localize image features and train the second networks to classify the localized image features based on a multi-class dataset associated with multiple classes in step 1202. In order to maximize the performance of the object detection network 900, 1000 so that it is capable of tagging many general objects, a very large dataset of images with multiple objects is necessary to train the object detection network 900, 1000. The object detection network 900, 1000 should be trained using a dataset having at least 600 classes of objects, preferably greater.

Subsequent to the initial training, the computing device may train the first and second networks, similar to step 1202, but based on a custom dataset of images associated with at least one custom class at step 1204. The second training of the first and second networks may be considered to be customization of the first training. Thus, customization of the object detection network 900, 1000 and the image classification networks 1100 may occur substantially later than initial training of these networks. In addition to, or in the alternative, the object detection network 900, 1000 and the image classification networks 1100 may be customized by a different person than the person who originally trained these networks. The first training person may have used a multi-class dataset whereas the second training person may customize the networks using a smaller dataset of custom image information. In other words, a first entity may initiate the step of training the networks based on the multi-class dataset of images, a second entity may initiate the step of training the networks based on the custom dataset of images, and the first and second entities may be different from each other. In this manner, the object detection network 900, 1000 and the image classification networks 1100, as trained based on the multi-class dataset of images, are provided as incremental training based on the custom dataset for a new object category or a sub-category of an existing object category. Also, the custom dataset of images associated with at least one custom class may include at least one fine-grained class of a general object category.

After training the first and second networks, the first network, such as the object detection network 900, 1000, receives an image 1112 that includes multiple visual objects at step 1206. The image 1112 may be a still image, a video image, or a multimedia image. For video or some types of multimedia, each frame or sampled frames from videos may be tagged, and a summary of the final tags may be generated using clustering. Next, the first network, such as object detection network 900, 1000, identifies multiple object regions associated with the visual objects at step 1208. The first network performs this function of identifying object regions as a result of being trained based on the multi-class dataset and the custom dataset. The computing device then assigns the object regions to multiple image classification networks 1100 at step 1210. Each object region is assigned to a particular second network, such as image classification network 1100. Thereafter, the second networks classify at least one visual object with the custom class or classes at step 1212. The second networks perform this function of classifying the visual object or objects as a result of being trained based on the multi-class dataset and the custom dataset. The second networks may classify at least one visual object with one or more fine-grained classes of a general object category.

Example System and Device

Figure 13:
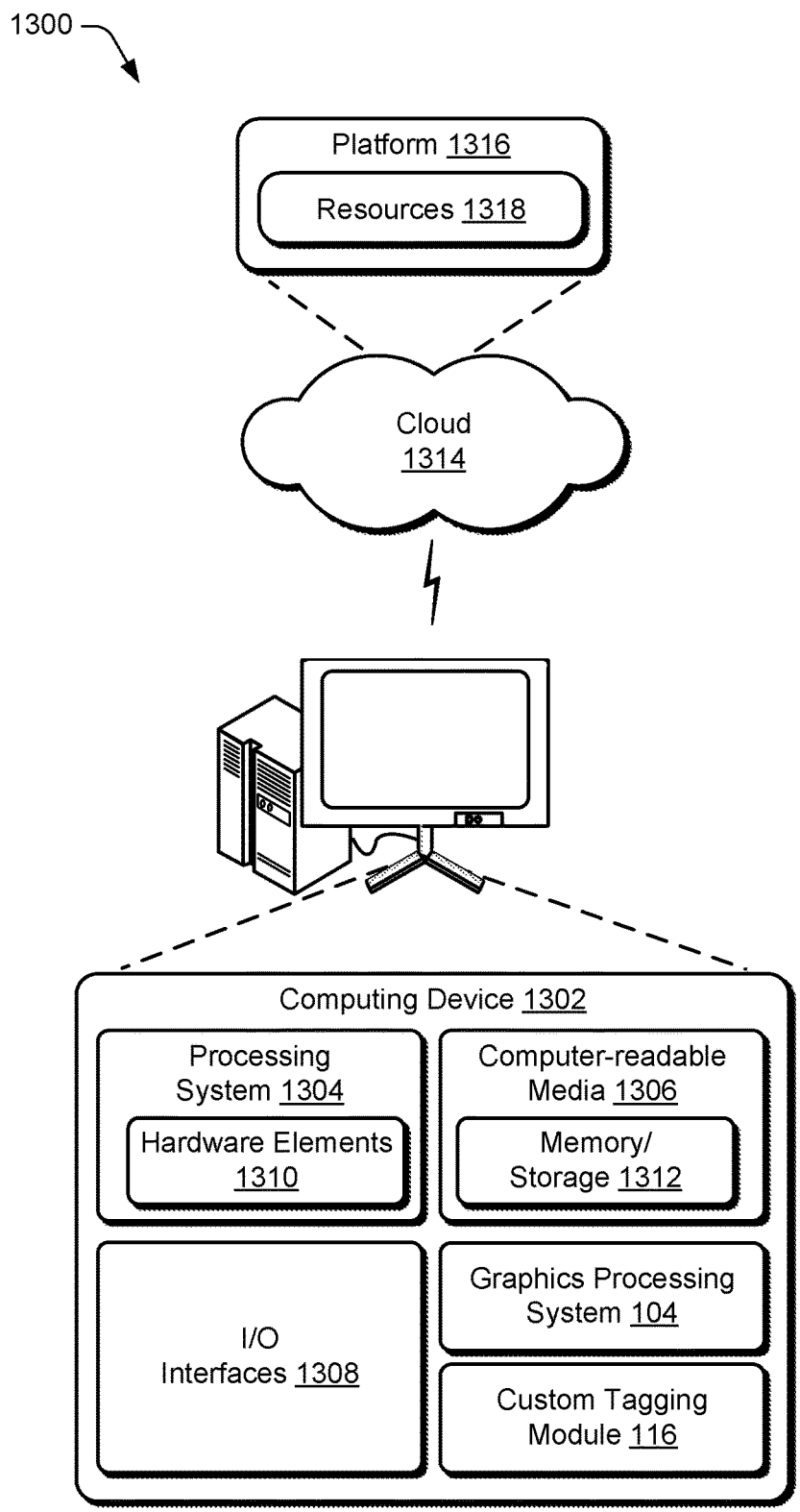
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the custom tagging module 116. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random-access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for custom auto tagging of multiple obj ects, a method implemented by a computing device including an object detection network and image classification networks, the method comprising:
    training the object detection network and the image classification networks to localize image features and classify the localized image features based on a multi-class dataset of images associated with a plurality of classes, and incrementally training the object detection network and the image classification networks based on a custom dataset of images associated with at least one custom class;
    receiving, at the object detection network, an image that includes multiple visual objects;
    applying, at the obj ect detection network, a plurality of first feature maps to the image and generate object regions each associated with a respective one of the multiple visual objects;
    assigning each of the object regions to one of the image classification networks and
    applying, at each of the image classification networks, a plurality of second feature maps to each obj ect region and outputting at least one class associated with a visual object of the multiple visual objects corresponding to each object region.

2. The method as described in claim 1, wherein the image is a still image, a video image, or a multimedia image.

3. The method as described in claim 1, wherein the plurality of second feature maps applied at the image classification networks are the same or similar to the plurality of first feature maps applied at the object detection network.

4. The method as described in claim 3, wherein at least a portion of the plurality of first feature maps is communicated from the object detection network to at least one of the image classification networks.

5. The method as described in claim 1, wherein the plurality of second feature maps applied at the image classification networks are different from the plurality of first feature maps applied at the object detection network.

6. The method as described in claim 5, wherein applying the plurality of second feature maps to each object region includes applying the plurality of first feature maps to each object region in conjunction with the plurality of second feature maps.

7. In a digital medium environment for custom auto tagging of multiple objects using a computing device, the computing device comprising:
    an object detection network and image classification networks trained to localize image features and classify the localized image features based on a multi-class dataset of images associated with a plurality of classes, and the object detection network and the image classification networks incrementally trained based on a custom dataset of images associated with at least one custom class;
    the object detection network configured to receive an image that includes multiple visual objects, apply a plurality of first feature maps to the image, and generate a plurality of object regions each associated with a respective one of the multiple visual objects; and
    the image classification networks configured to receive a particular object region of the plurality of object regions at each of the image classification networks, apply a plurality of second feature maps to each object region, and output at least one class associated with a visual object of the multiple visual objects corresponding to each object region.

8. The computing device as described in claim 7, wherein the image is a still image, a video image, or a multimedia image.

9. The computing device as described in claim 7, wherein the plurality of second feature maps applied at the image classification network networks are the same or similar to the plurality of first feature maps applied at the object detection network.

10. The computing device as described in claim 9, wherein each image classification network receives a portion of the plurality of first feature maps from the object detection network.

11. The computing device as described in claim 7, wherein the plurality of second feature maps applied at the image classification networks are different from the plurality of first feature maps applied at the object detection network.

12. The computing device as described in claim 11, wherein the plurality of first feature maps are applied to each object region in conjunction with the plurality of second feature maps.

13. In a digital medium environment for custom auto tagging of multiple objects, a method implemented by a computing device including an object detection network and a plurality of image classification networks, the method comprising:
    training the object detection network and the plurality of image classification networks to localize image features and classify the localized image features based on a multi-class dataset of images associated with a plurality of classes;
    training the object detection network and the plurality of image classification networks to localize image features and classify the localized image features based on a custom dataset of images associated with at least one custom class, including incremental training of the object detection network and the plurality of image classification networks, as trained based on the multi-class dataset of images, for a new object category or a sub-category of an existing object category;
    receiving, at the object detection network, an image that includes a plurality of visual objects;
    identifying a plurality of object regions associated with the plurality of visual objects, at the object detection network as trained based on the multi-class dataset and the custom dataset; and
    classifying at least one visual object of the plurality of visual objects with the at least one custom class, at the plurality of image classification networks as trained based on the multi-class dataset and the custom dataset.

14. The method as described in claim 13, wherein the image is a still image, a video image, or a multimedia image.

15. The method as described in claim 13, further comprising assigning the plurality of object regions to the plurality of image classification networks, each object region of the plurality of object regions being assigned to a particular image classification network of the plurality of image classification networks.

16. The method as described in claim 13, wherein training the object detection network and the plurality of image classification networks based on the custom dataset of images is subsequent to training the object detection network and the plurality of image classification networks based on the multi-class dataset of images.

17. The method as described in claim 13, wherein:
    a first entity initiates the training the object detection network and the plurality of image classification networks based on the multi-class dataset of images;
    a second entity initiates the training for the object detection network and the plurality of image classification networks based on the custom dataset of images; and
    the first and second entities are different.

18. The method as described in claim 13, wherein the custom dataset of images associated with at least one custom class includes at least one fine-grained class of a general object category.

19. The method as described in claim 13, wherein classifying the at least one visual object of the plurality of visual objects with the at least one custom class includes classifying the at least one visual object with the at least one fine-grained class of the general object category.

20. The method as described in claim 1, wherein the training the object detection network and the image classification networks based on the custom dataset of images is subsequent to training the object detection network and the image classification networks based on the multi-class dataset of images.

* * * * *

UNITED STATES PATENT AND TRADEMARK OFFICE
CERTIFICATE OF CORRECTION

PATENT NO. : 10,733,480 B2
APPLICATION NO. : 16/039311
DATED : August 4, 2020
INVENTOR(S) : Jayant Kumar, Zhe Lin and Vipulkumar C. Dalal Page 1 of 1

It is certified that error appears in the above-identified patent and that said Letters Patent is hereby corrected as shown below:

In the Claims

Column 16, Line 40, Claim 1 after "of multiple", delete "obj ects", insert -- objects --, therefor.

Column 16, Line 53, Claim 1 after "applying, at the", delete "obj ect", insert -- object --, therefor.

Column 16, Line 60, Claim 1 after "maps to each", delete "obj ect", insert -- object --, therefor.

Column 17, Line 2, Claim 3 after "maps applied at the", delete "obj ect", insert -- object --, therefor.

Column 17, Line 11, Claim 5 after "applied at the", delete "obj ect", insert -- object --, therefor.

Column 17, Line 13, Claim 6 after "maps to each", delete "obj ect", insert -- object --, therefor.

Column 17, Line 45, Claim 9 after "classification", delete "network", therefor.

Signed and Sealed this
Twentieth Day of October, 2020

Andrei Iancu
*Director of the United States Patent and Trademark Office*